(12) United States Patent
Ghosh

(10) Patent No.: US 11,928,781 B2
(45) Date of Patent: Mar. 12, 2024

(54) MESH SIMPLIFICATION

(71) Applicant: Microsoft Technology Licensing, LLC, Redmond, WA (US)

(72) Inventor: Deboshmita Ghosh, Albany, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 159 days.

(21) Appl. No.: 17/657,736

(22) Filed: Apr. 1, 2022

(65) Prior Publication Data
US 2023/0316652 A1 Oct. 5, 2023

(51) Int. Cl.
*G06T 17/20* (2006.01)
*G06T 7/64* (2017.01)
*G06T 15/04* (2011.01)
*G06V 40/10* (2022.01)

(52) U.S. Cl.
CPC .......... *G06T 17/205* (2013.01); *G06T 7/64* (2017.01); *G06T 15/04* (2013.01); *G06V 40/107* (2022.01); *G06T 2200/08* (2013.01); *G06T 2207/10028* (2013.01); *G06T 2207/30196* (2013.01); *G06T 2210/56* (2013.01)

(58) Field of Classification Search
CPC .... G06T 15/04; G06T 2200/08; G06V 40/107
See application file for complete search history.

(56) References Cited

U.S. PATENT DOCUMENTS

| | | | |
|---|---|---|---|
| 5,929,860 | A | 7/1999 | Hoppe et al. |
| 2021/0125413 | A1 | 4/2021 | Goorts et al. |
| 2021/0225074 | A1 | 7/2021 | Meilland et al. |

(Continued)

FOREIGN PATENT DOCUMENTS

| | | |
|---|---|---|
| CN | 112613487 A | 4/2021 |
| KR | 102215290 B1 | 2/2021 |
| KR | 20210061264 A | 5/2021 |

OTHER PUBLICATIONS

Ju, et al., "Foveated computer-generated hologram and its progressive update using triangular mesh scene model for hear-eye displays", In Journal of Optics Express, vol. 27, Issue 17, Aug. 5, 2019, 14 Pages.

(Continued)

*Primary Examiner* — Grace Q Li
(74) *Attorney, Agent, or Firm* — Alleman Hall & Tuttle LLP

(57) ABSTRACT

An initial mesh is received comprising a hand of a subject. The initial mesh includes a plurality of vertices. A smoothed mesh is generated, and a discrete curvature of the smoothed mesh is determined for each vertex. One or more candidate finger vertices are identified based upon a determination that the discrete curvature for each of the one or more candidate vertices is greater than or equal to a threshold curvature. One or more seed vertices are identified from among the one or more candidate finger vertices based upon a determination that the discrete curvature for one or more other vertices within a neighborhood of each seed vertex is greater than or equal to the threshold curvature. Dilation is performed on the one or more seed vertices to grow one or more patches from the one or more seed vertices. The one or more patches are deprioritized for mesh simplification.

20 Claims, 11 Drawing Sheets

(56) References Cited

U.S. PATENT DOCUMENTS

2021/0358214 A1    11/2021  Comer
2021/0366189 A1*  11/2021  Borduas ................... G06T 5/30

OTHER PUBLICATIONS

Prada, et al., "Spatiotemporal Atlas Parameterization for Evolving Meshes", In Publication of ACM Transactions on Graphics, Jul. 20, 2017, 12 Pages.

* cited by examiner 7k mesh after (814)
7k texture after (816)
7k mesh before (802)
7k texture before (804)

30k mesh after (908)

30k texture after (910)

30k mesh before (902)

30k texture before (904)

MESH SIMPLIFICATION

BACKGROUND

An array of cameras can be used to generate volumetric images and videos for display in virtual reality (VR) and/or augmented reality (AR) environments. In some instances, AR/VR content is represented as a mesh that is constructed from point clouds generated by the array of cameras. The mesh comprises a plurality of vertices, edges and faces that define a polyhedral representation of an object's structure. Simplifying this mesh to decrease the number of vertices, edges and faces reduces an amount of memory occupied by the mesh and reduces processing time to meet the video encoding budgets of different devices. However, simplifying the mesh can reduce a resolution of detailed regions of the mesh and introduce visual artifacts in the AR/VR content.

SUMMARY

Examples are disclosed that relate to simplifying a mesh that help to address the issues discussed above. One example provides a computing device. The computing device comprises a processor, and a memory storing instructions executable by the processor. The instructions are executable to receive an initial mesh comprising a hand of a subject. The initial mesh includes a plurality of vertices. The instructions are further executable to generate a smoothed mesh. Via execution of the instructions, a discrete curvature of the smoothed mesh is determined for each vertex of the plurality of vertices. One or more candidate finger vertices are identified from among the plurality of vertices based upon a determination that the discrete curvature for each of the one or more candidate vertices is greater than or equal to a threshold curvature. One or more seed vertices are identified from among the one or more candidate finger vertices based upon a determination that the discrete curvature for one or more other vertices within a neighborhood of each seed vertex is greater than or equal to the threshold curvature. Dilation is performed on the one or more seed vertices to grow one or more patches from the one or more seed vertices, and the one or more patches are deprioritized for mesh simplification.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

As introduced above, a high-resolution mesh may be simplified to decrease a number of vertices, edges and faces that define an object's structure. However, details are lost in the simplification process. This can introduce visual artifacts in detailed regions of the mesh, such as portions of the mesh near faces and hands. Artifacts in such detailed regions of the mesh, such as thin, pointy fingers and missing fingertips, can be easily perceived, and can detract from realism in a virtual reality (VR) or augmented reality (AR) environment.

In some instances, computer vision and machine learning (ML)-based tools are used to detect hands and fingers in an image. However, it can be challenging to accurately map the detected portions of the image to the mesh. In addition, it can be challenging to train models to recognize hands and fingers in a run-time input image. For example, generating an extensive training data set of labeled images can be time consuming, and ML models can be computationally expensive to train and implement. Further, ML models may struggle to maintain accuracy across skin tones and textures that may differ from those in the training data set.

Explicit rule-based methods may be less computationally expensive and less susceptible to bias than ML-based approaches. However, it can be challenging to achieve suitable accuracy. For instance, local curvature may be utilized to isolate fingers or hands, which may have a higher level of curvature than other regions of the mesh. However, utilizing local curvature alone may result in identification of false positives. For instance, vertices corresponding to folds in a subject's clothing may also have a high level of curvature. This may lead to such vertices being incorrectly identified as part of the subject's hands. The identification of false positives preserves geometry of those regions of the mesh during simplification at the expense of other areas, including the subject's hands.

Accordingly, and to address the issues discussed above, examples are disclosed that relate to devices and methods for generating a simplified mesh that may preserve structural details of regions such as a subject's hands. Briefly, one or more candidate finger vertices are identified from among a plurality of vertices in an initial mesh based upon a discrete curvature of a smoothed mesh. One or more seed vertices are identified from among the one or more candidate finger vertices based upon the discrete curvature for one or more other vertices within a neighborhood of each seed vertex. Dilation is performed on the one or more seed vertices to grow one or more patches from the one or more seed vertices, which are deprioritized for mesh simplification. This technique preserves detail in regions corresponding to the subject's hands during mesh simplification and accurately identifies those regions regardless of skin tone or other textures.

Figure 1:
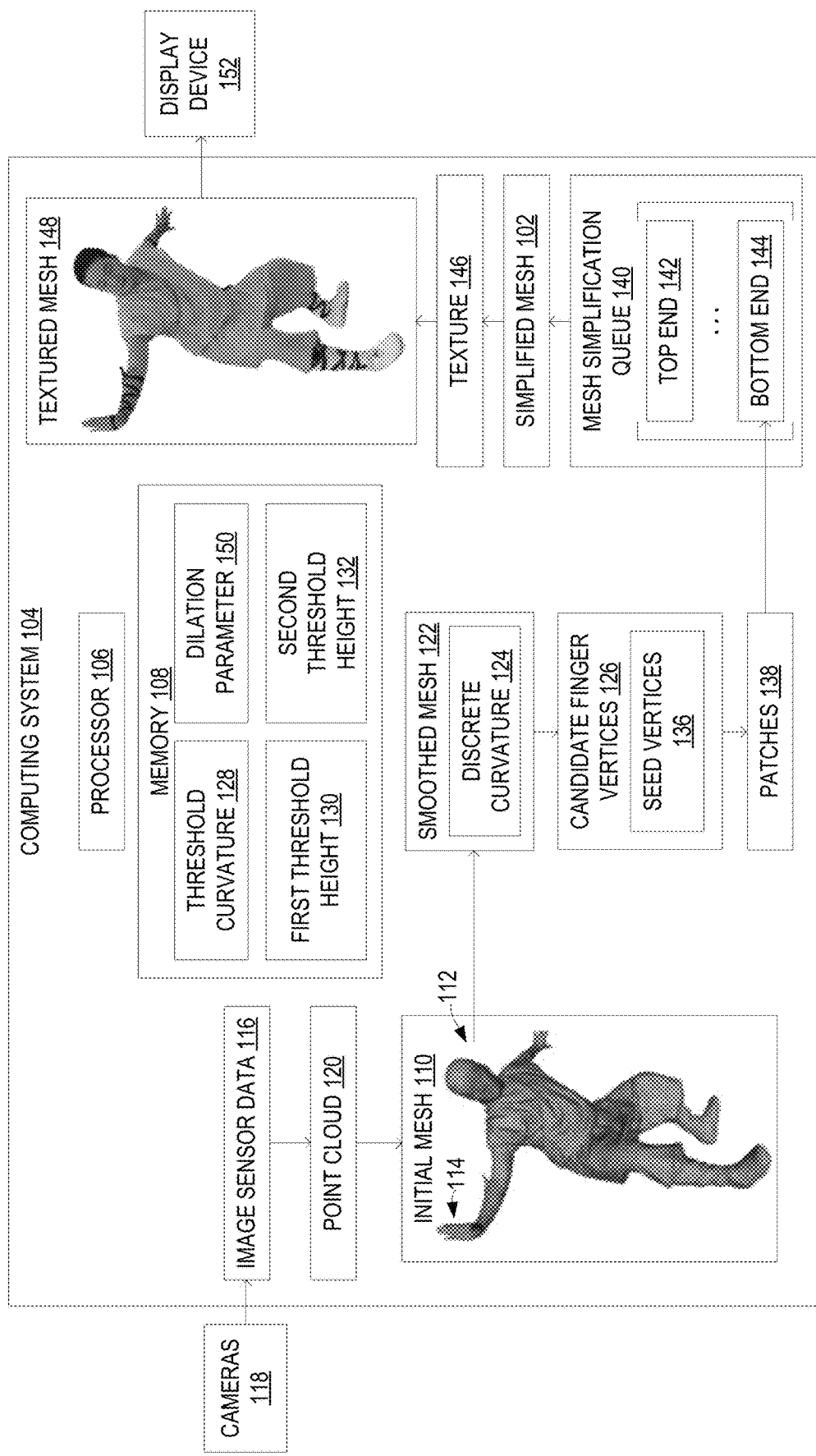
FIG. 1 shows an example of a system for generating a simplified mesh according to an example embodiment of the subject disclosure.

FIG. 1 shows an example of a computing system 104 for generating a simplified mesh 102. The system 100 includes one or more physical computing devices. In some examples, the one or more physical computing devices comprise one or more server computing devices (e.g., cloud servers). In other examples, the computing system 104 comprises any other suitable type of computing device. Other suitable examples of computing devices include, but are not limited to, a laptop computing device, a desktop computing device, and a tablet computing device. Additional aspects of the computing system 104 are described in more detail below with reference to FIG. 10.

The computing system 104 comprises a processor 106. In some examples, the processor 106 comprises one or more central processing units (CPUs). The computing system 104 further comprises a memory 108 storing instructions executable by the processor 106 to implement the methods described herein.

The computing system 104 is configured to receive an initial mesh 110 comprising a three-dimensional (3D) structural representation of a subject 112. In some examples, the initial mesh 110 represents a still 3D image of the subject 112. In other examples, the initial mesh 110 comprises a single frame of a time-varying sequence of frames (e.g., a frame of a 3D video of the subject 112).

The initial mesh 110 includes a hand 114 of the subject 112. As introduced above, the initial mesh 110 comprises a plurality of vertices, edges and faces. In the present example, the initial mesh 110 comprises a triangular mesh. In other examples, any other suitable shapes may be used. Other examples of suitable shapes include, but are not limited to, rectangles, pentagons, and other polygons. These faces, as well as their edges and vertices, are assembled to form the 3D structural representation of the subject.

Figure 2:
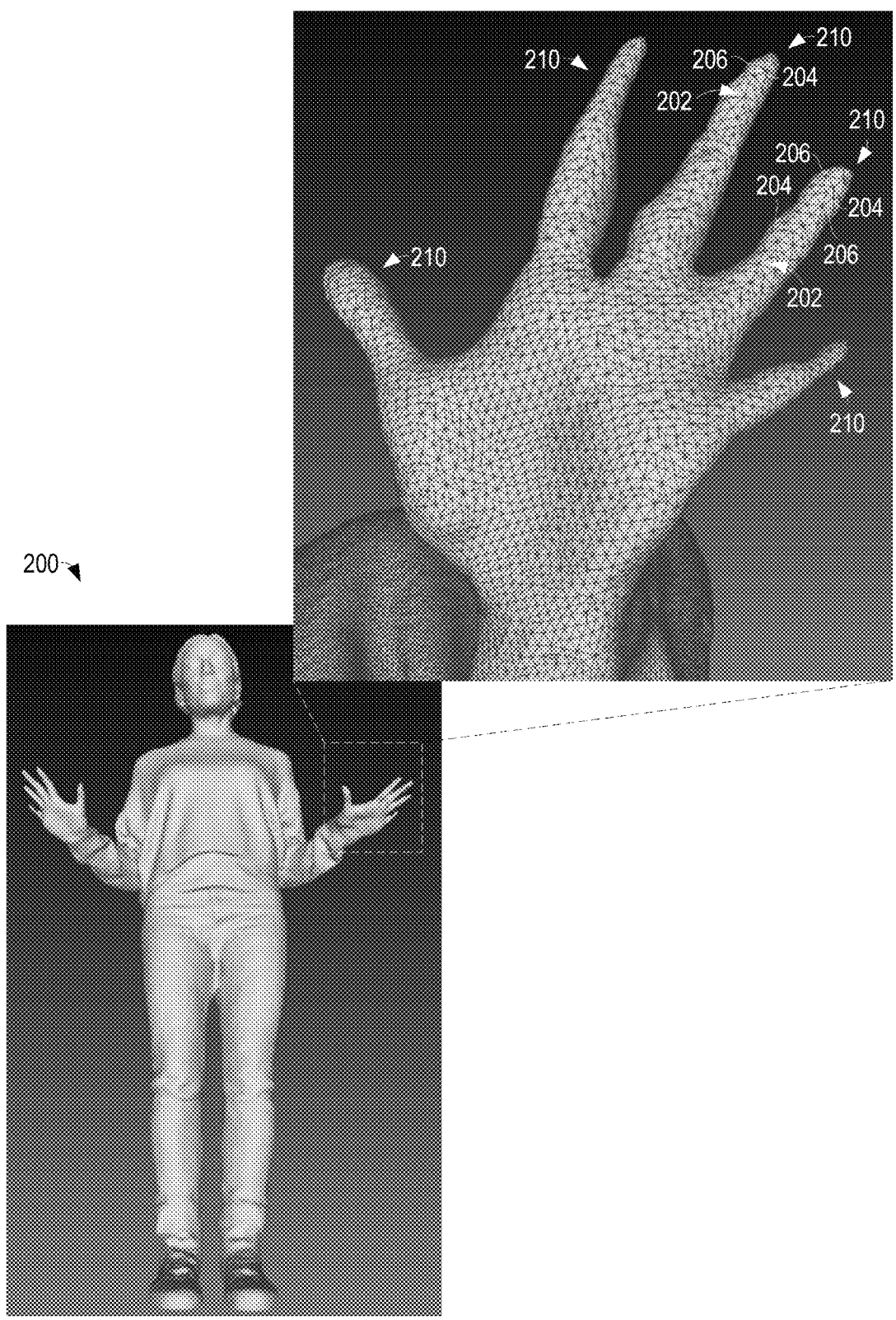
FIG. 2 shows an example of an initial mesh.

FIG. 2 shows another example of an initial mesh 200. The initial mesh 200 depicts a portion of a hand using a plurality of triangular faces 202 joined at a plurality of edges 204 and vertices 206. In the example of FIG. 2, the initial mesh 200 comprises approximately 400,000 triangles 202.

With reference again to FIG. 1, in some examples, the initial mesh 110 is generated using image sensor data 116 output by one or more cameras 118. In some examples, the computing system 104 is configured to receive the image sensor data 116 from the one or more cameras 118. In some such examples, the computing system 104 is configured to process the image sensor data 116 to generate a point cloud 120 comprising the hand 114 of the subject 112. The point cloud 120 is used to generate the initial mesh 110. In this manner, the computing system 104 is configured to process the image sensor data 116 locally to generate the initial mesh 110. In other examples, the initial mesh 110 is generated at another computing system. In this manner, the processing of the image sensor data 116, which may be computationally expensive, is be offloaded from the computing system 104.

As introduced above, the initial mesh 110 is a high-resolution mesh having a greater number of faces, edges, and/or vertices per unit of volume than the simplified mesh 102. As mentioned above, in some examples, the initial mesh 110 may comprise approximately 400,000 triangles. The simplified mesh 102 comprises fewer triangles (e.g., 7,000-20,000 triangles) that depict the subject at the same size as in the initial mesh 110. Accordingly, and in one potential advantage of the present disclosure, the simplified mesh 102 meets the encoding budget of high-quality video streams that can be played of a variety of devices. It also occupies less space in a memory of a computing device (e.g., the memory 108) and is faster to process than the initial mesh 110.

Next, the computing system 104 is configured to generate a smoothed mesh 122 based upon the initial mesh 110. As described in more detail, fingertips can be differentiated from other regions of the initial mesh 110 based upon the local curvature of the mesh. For example, a region surrounding a fingertip is locally convex. In addition, fingers are relatively long and narrow compared to other parts of the human body. These aspects of a subject's fingers can be identified by computing the curvature of the mesh.

In some examples, generating the smoothed mesh 122 comprises computing mean curvature flow of the initial mesh 110. Mean curvature flow may be defined as follows:

$$\vec{H} = -\frac{t}{2}\sum_{p \in e}\vec{N_e}\|e\|\sin\left(\frac{\theta}{2}\right) \quad (1)$$

Figure 3:
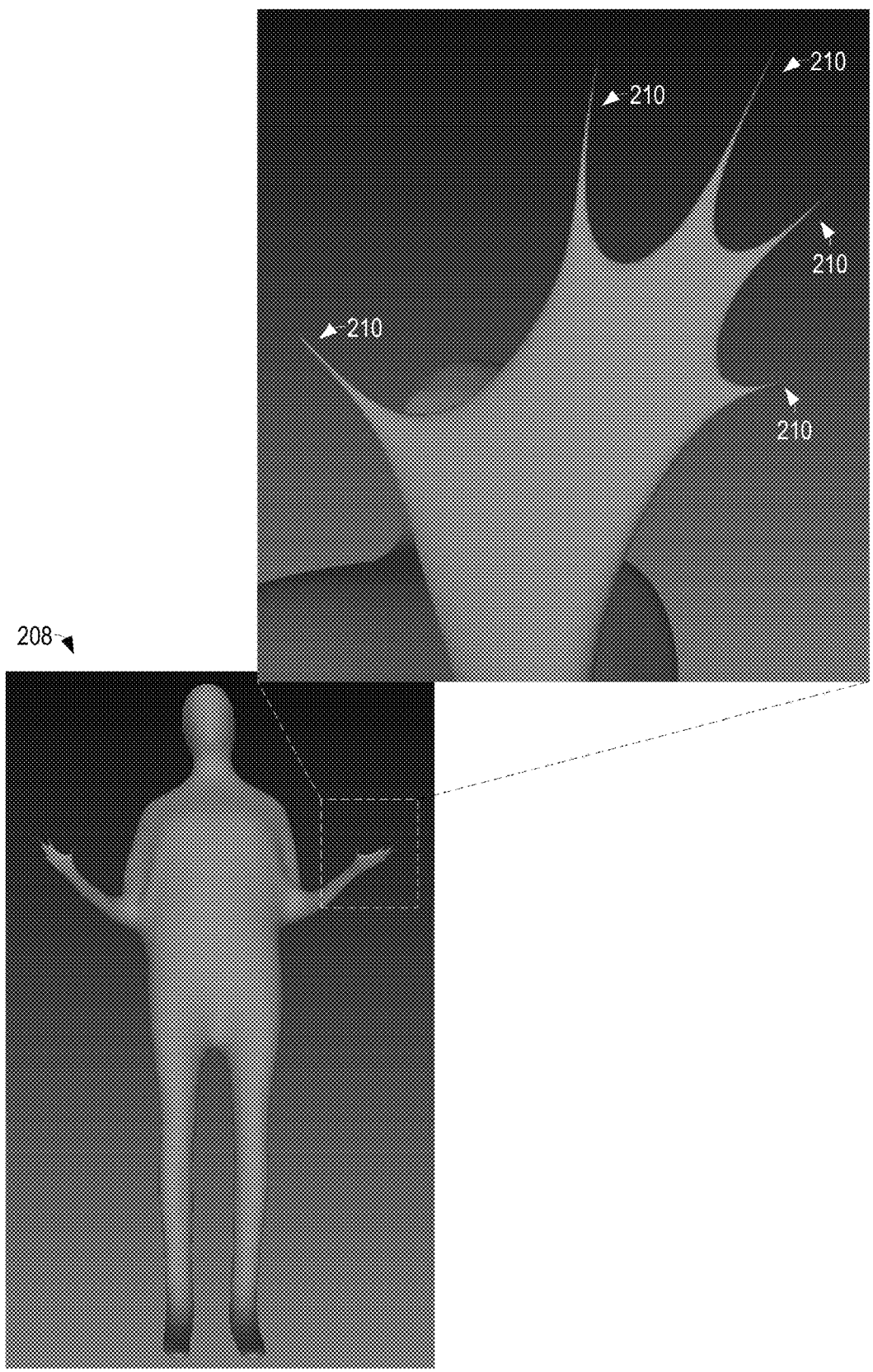
FIG. 3 shows an example of a smoothed mesh that can be generated from the initial mesh of FIG. 2.

Here, t represents a time step of a particular evolved mesh, p is a vertex of the initial mesh 110, $\vec{N_e}$ is a normal to an edge e, and θ is an angle between two adjacent normal. Mean Curvature Flow iteratively moves vertices at each time-step to locally reduce the mean curvature. A vertex in high curvature region will move with a faster velocity than vertices that are on a flatter region. The velocity of each vertex p is given by the mean curvature vector $\vec{H(p)}$. For a convex, embedded, compact surface, this will ultimately reduce to a point in 3D Euclidean space $\mathbb{R}_3$. FIG. 3 shows an example of a smoothed mesh 208 generated by computing mean curvature flow on the initial mesh 200 of FIG. 2. As shown in the example depicted in FIG. 3, the mean curvature flow smooths the mesh while preserving pointed features, such as fingertips 210. Preserving these features can reduce the occurrence of false positives.

In other examples, any other suitable smoothing method may be used. Another example of a suitable smoothing method includes, but is not limited to, computing an average curvature for a neighborhood surrounding each vertex. This average representation of local curvature can be used to identify regions that likely correspond to the subject's fingertips in the mesh.

Referring again to FIG. 1, the computing system 104 is further configured to, for each vertex of the plurality of vertices, determine a discrete curvature 124 of the smoothed mesh 122. One or more candidate finger vertices 126 are identified from among the plurality of vertices based upon a determination that the discrete curvature 124 for each of the one or more candidate vertices 126 is greater than or equal to a threshold curvature 128. As introduced above, the region around a fingertip is locally convex, and fingers are long and narrow. The computing system 104 filters the smoothed mesh 122 to identify vertices that correspond to these features. Accordingly, and in one potential advantage of the present disclosure, the one or more candidate finger vertices can be accurately identified across diverse skin tones and image textures, in contrast to computer vision and other ML-based techniques which are subject to training bias.

The smoothed mesh 122 is mapped to the initial mesh 110. For example, the smoothed mesh 208 of FIG. 3 has the same number of vertices as the initial mesh 200 of FIG. 2. In this manner, a vertex on the smoothed mesh 208 can be indexed to a location of a corresponding vertex 206 in the initial mesh 200. In this manner, the computing system 104 of FIG. 1 is configured to identify the one or more candidate finger vertices 126 in the initial mesh 110 based upon the discrete curvature 124 of one or more corresponding locations in the smoothed mesh 122. This provides the computing system 104 with one or more candidate locations within the initial mesh 110 that likely correspond to fingertips.

As shown in FIG. 3, most of the mean curvature flow mesh 208 is smooth. The thin, narrow regions which correspond to fingertips 210 become pointy in the smoothed mesh 208. Vertices that correspond to these fingertips 210 have a curvature greater than the threshold curvature. In some examples, the threshold curvature is in the range of 0-1. In other examples, any other suitable threshold curvature may be used. Higher values result in identifying candidate finger vertices in high curvature areas, while lower values pick up vertices in flatter regions. Corresponding vertices in the initial mesh 200 are identified and marked as candidate finger vertices.

Figure 4:
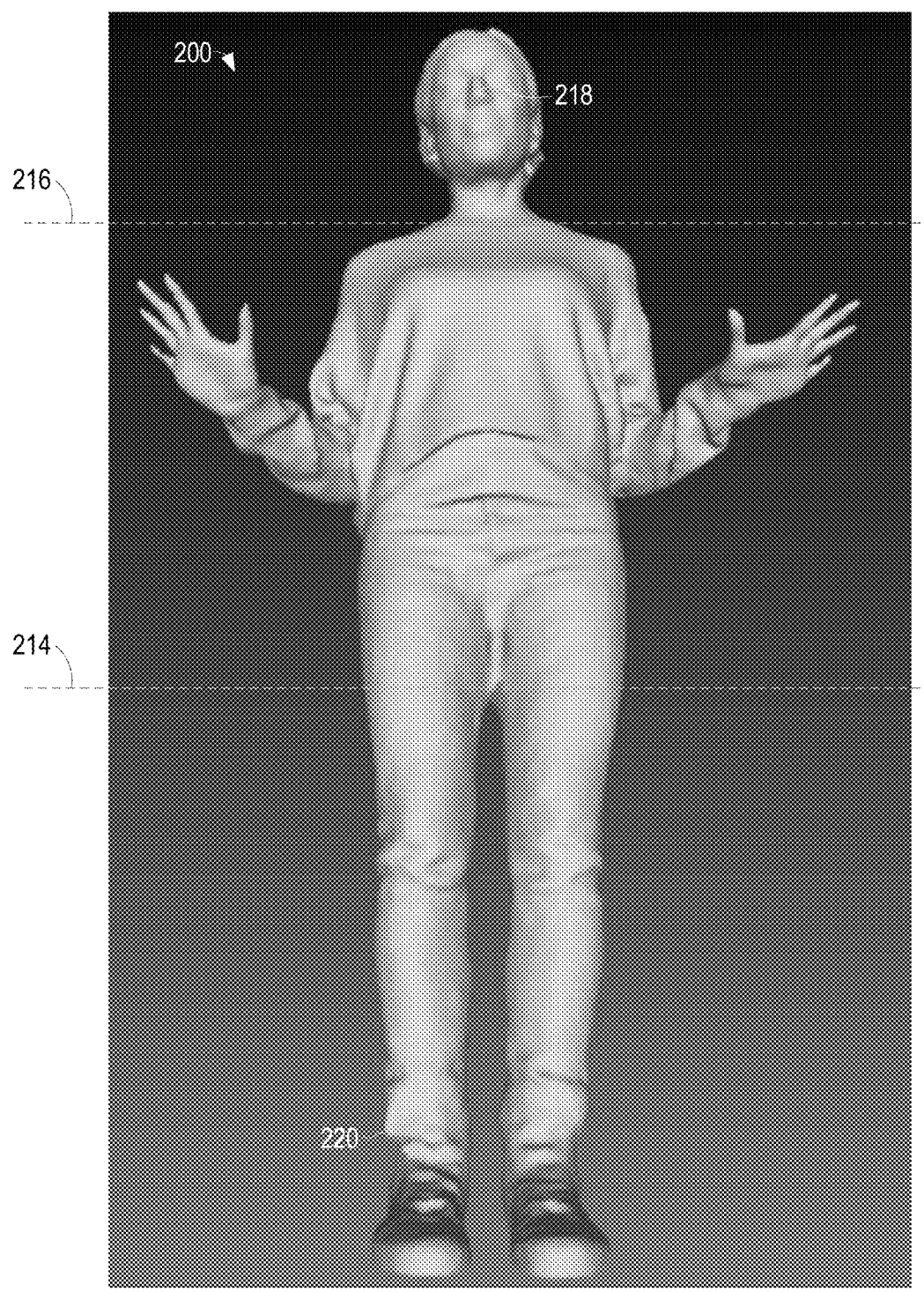
FIG. 4 shows an example of a first threshold height and a second threshold height that can be used to identify one or more candidate finger vertices in the initial mesh of FIG. 2.

In some examples, the computing system 104 of FIG. 1 is configured to identify the one or more candidate finger vertices 126 above a first threshold height 130 and/or below a second threshold height 132. For example, FIG. 4 shows a first dashed line 214 corresponding to a first threshold height and a second dashed line 216 corresponding to a second threshold height superimposed on the initial mesh 200 of FIG. 2. In some examples, the first threshold height is in the range of 1-3 feet and the second threshold height is in the range of 5-6 feet. In other examples, any other suitable height values may be used. Identifying the one or more candidate finger vertices above the first threshold height and/or below the second threshold height excludes candidate vertices that may be selected as false positives, such as a vertex corresponding to a tip 218 of the subject's nose or a fold 220 in the subject's pants. Identifying the candidate finger vertices above the first threshold height and/or below the second threshold height also enables the candidate finger vertices to be identified more rapidly than by processing the entire mesh.

Figure 5:
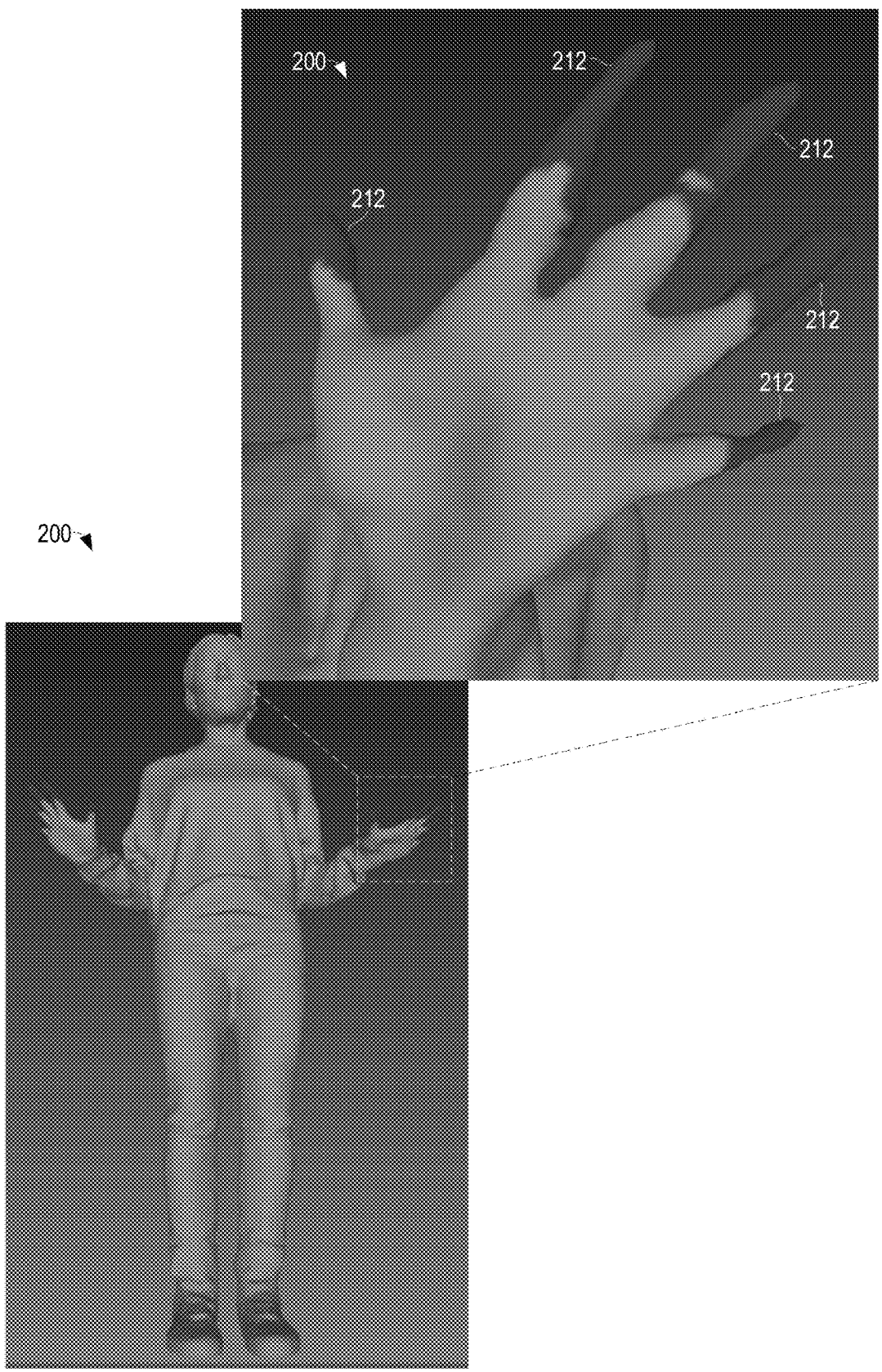
FIG. 5 shows a plurality of seed vertices identified in the initial mesh of FIG. 2.

Referring again to FIG. 1, one or more seed vertices 136 are identified from among the one or more candidate finger vertices 126. The one or more seed vertices 136 are selected based, for example, at least upon a determination that the discrete curvature 124 for one or more other vertices within a neighborhood of each seed vertex 136 is greater than or equal to the threshold curvature 128. In some examples, the neighborhood of each seed vertex 136 comprises an n-ring neighborhood. In some such examples, the neighborhood of each seed vertex comprises an area within 3 rings of the seed vertex 136. FIG. 5 shows the initial mesh of FIG. 2, including a plurality of seed vertices 212 identified using a 3-ring neighborhood. In other examples, any other suitable number of rings may be used. Other examples of suitable numbers of rings include, but are not limited to, 1-5 rings. In yet other examples, the neighborhood of each seed vertex is defined in any other suitable manner, such as by selecting any vertices within a predetermined circular or rectangular area. In this manner, any vertices without neighbors that also have a curvature that meets the threshold 128 are excluded from further processing. This can reduce the occurrence of false positives. It will also be understood that, in instances where an initial mesh does not include a fingertip, the initial mesh may pass through to mesh simplification without any seed vertices being detected or prioritized during simplification.

Figure 6:
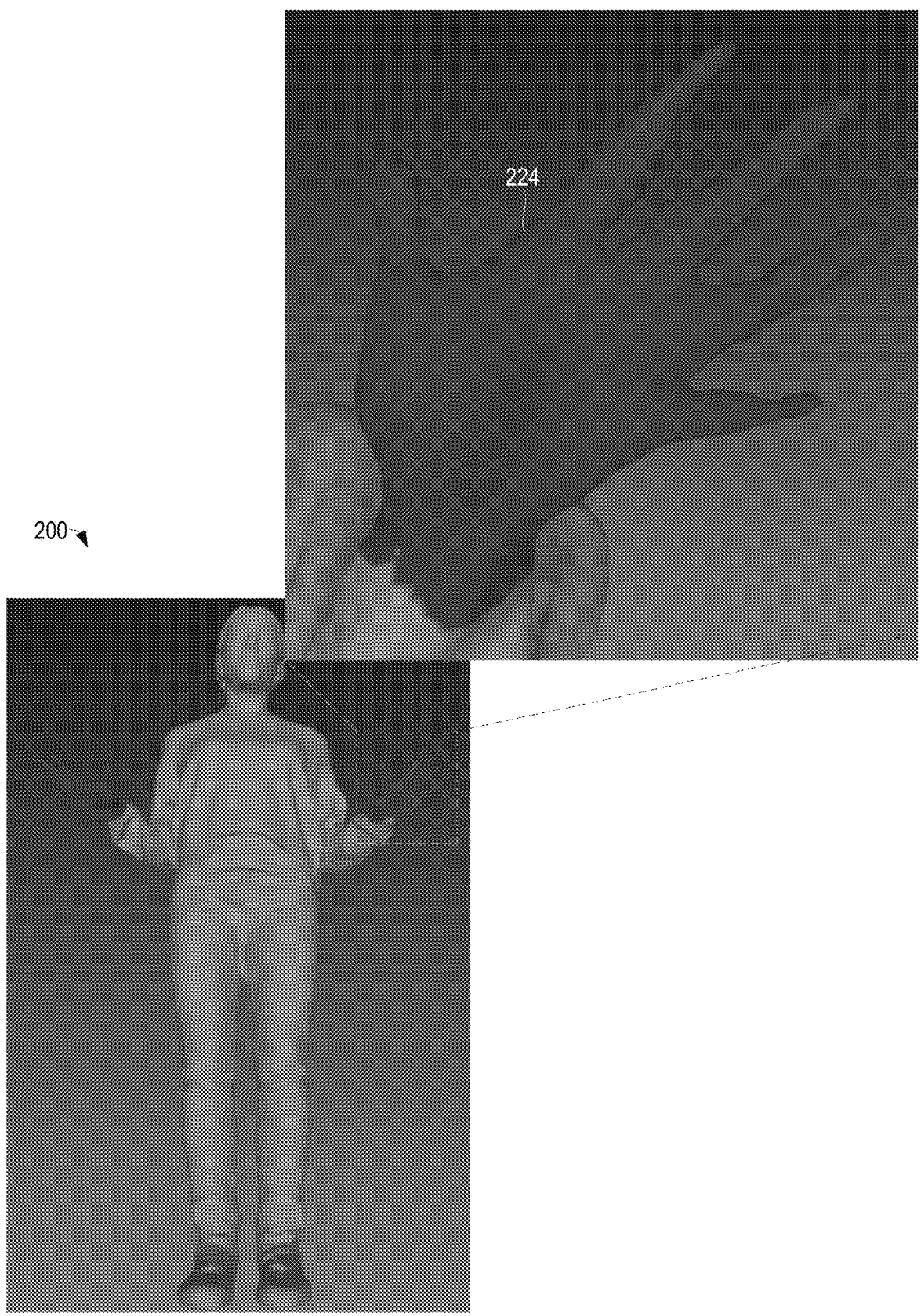
FIG. 6 shows an example of a patch grown by dilating the seed vertices of FIG. 5.

Next, the computing system 104 is configured to perform dilation on the one or more seed vertices 136 to grow one or more patches 138 from the one or more seed vertices 136. FIG. 6 shows an example of a patch 224 grown by dilating the seed vertices 212 of FIG. 5. In some examples, a breadth-first algorithm is used to grow the patch 224. Geodesic neighbors are selected stating from each of the seed vertices 212 of FIG. 5 using breath-first traversal. A dilation ring radiating out of each seed vertex is defined by a dilation parameter 150. The dilation parameter 150, which may be user-defined, indicates how many neighbors of a seed vertex 136 are aggregated into the patch 138. In some examples, the dilation is performed with a dilation parameter in the range of 15-25. In other examples, any other suitable dilation parameter values may be used. Other examples of suitable dilation parameters include, but are not limited to, values in the range of 0-40. In yet other examples, the dilation parameter is greater than 40.

Referring again to FIG. 1, the computing system 104 is configured to deprioritize the one or more patches 138 for mesh simplification. In this manner, the one or more patches 138 designate regions in which to preserve resolution while simplifying the initial mesh 110. For example, the patch 224 of FIG. 6 corresponds to a portion of the mesh 200 that represents a hand of the subject. Accordingly, and in one potential advantage of the present disclosure, mesh simplification is carried out in a manner that preserve detail in a region corresponding to the subject's hand.

In some examples, mesh simplification is carried out based upon a mesh simplification queue 140. Mesh simplification begins with a portion of the initial mesh 110 queued at a top end 142 of the queue 140. Simplification continues down towards a bottom end 144 of the queue 140 and terminates when the simplified mesh 102 reaches a predetermined number of edges, vertices, and/or faces (e.g., 20,000 triangles in some examples). Accordingly, a portion of the initial mesh 110 queued at the bottom end 144 of the queue 140 retains more detail than another portion of the initial mesh queued at the top end 142 of the queue 140.

Thus, when simplification is carried out in this manner, the computing system 104 is configured to deprioritize the one or more patches 138 for mesh simplification by queuing a portion of the initial mesh corresponding to the one or more patches 138 at the bottom end 144 of the mesh simplification queue 140. In this manner, a portion of the simplified mesh 102 corresponding to the one or more patches 138 queued at the bottom end 144 of the mesh simplification queue 140 has a higher resolution, and thus depicts an area corresponding to the one or more patches 138 in greater detail than another portion of the simplified mesh placed higher in the queue 140.

It will also be appreciated that deprioritizing the one or more patches 138 for mesh simplification may be performed in any other suitable manner. Another example of deprioritizing the one or more patches 138 includes, but is not limited to, not queuing a portion of the initial mesh 110 corresponding to the one or more patches 138 for simplification. In this manner, the simplified mesh 102 retains all of the detail of the initial mesh 110 within the one or more patches 138.

In some examples, the computing system 104 is configured to generate the simplified mesh 102. In other examples, the simplified mesh 102 is generated at another computing system. In this manner, aspects of mesh simplification that may be computationally expensive are offloaded from the computing system.

A texture 146 may be applied to the simplified mesh 102 to produce a textured simplified mesh 148. The textured simplified mesh 148 is output for display via a display device 152, such as a head-mounted display (HMD) device. In this manner, the simplified mesh is used to produce 3D content (e.g., for AR and/or VR applications) that occupies less memory and is less computationally expensive to process than content produced using a high-resolution unsimplified mesh.

In some examples, the computing system 104 is configured to apply the texture 146 to the simplified mesh 102 and output the textured simplified mesh 148. In other examples, the textured simplified mesh 148 is generated at another computing system. In this manner, aspects of texturing the simplified mesh that may be computationally expensive are offloaded from the computing system.

Figure 7:
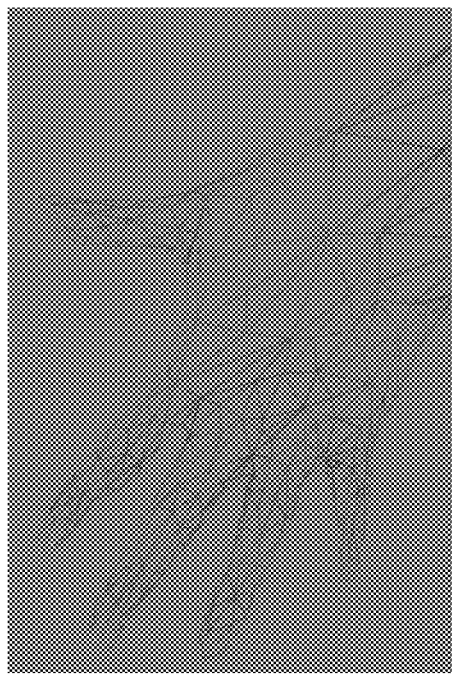
FIG. 7 shows an example of a simplified mesh, with (right) and without (left) the presented example technique
Figure 7:
Figure 7:
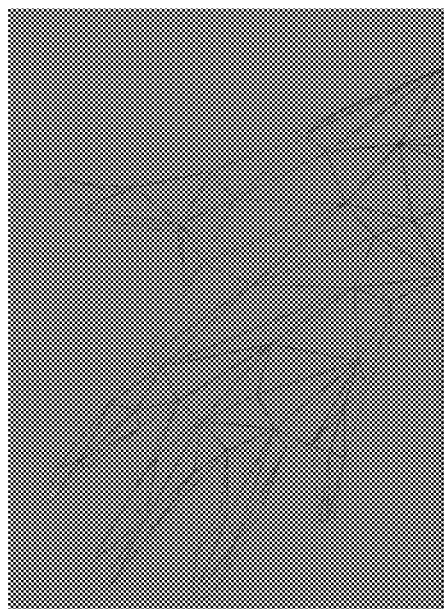
Figure 7:
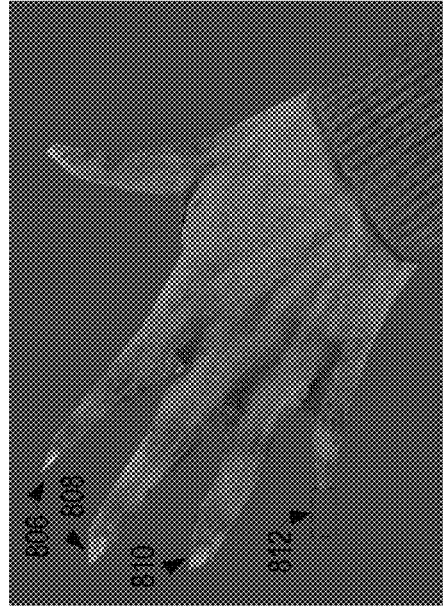
Figure 8:
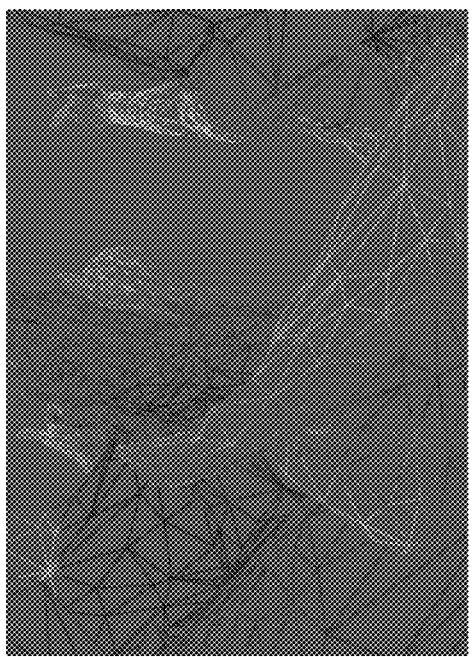
FIG. 8 shows yet another example of a simplified mesh, with (right) and without (left) the presented example technique
Figure 8:
Figure 8:
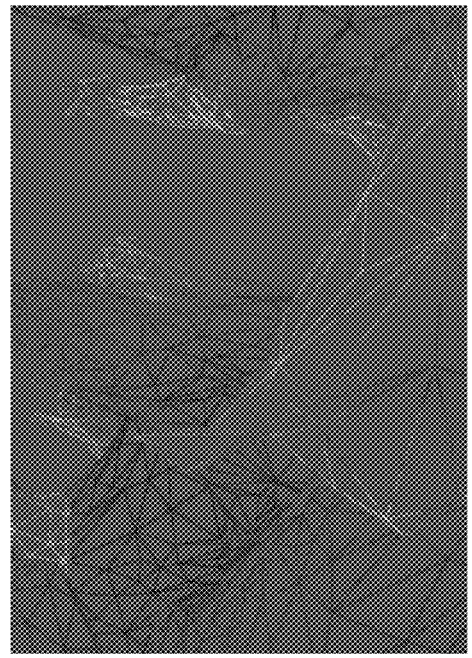
Figure 8:
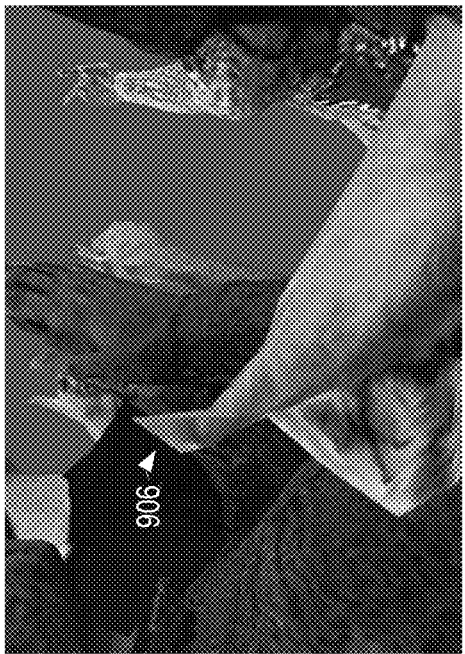

FIGS. 7 and 8 show additional examples of simplified meshes generated as described above. As illustrated in the examples of FIGS. 7 and 8, the methods described herein yielded higher resolution meshes with fewer visual artifacts than simplified meshes produced without deprioritizing one or more patches corresponding to a subject's fingers and/or hands.

Referring to FIG. 7, frame 802 shows a portion of a simplified mesh comprising a hand of a subject. The simplified mesh depicted in frame 802 comprises 7,000 triangles and was produced using mesh decimation without identifying one or more patches corresponding to the hand as described herein. Frame 804 shows a texture applied to the simplified mesh of frame 802. As shown in frame 804, the textured mesh includes visual artifacts in the form of pointy fingertips 806-810 and a missing fingertip at 812.

In contrast, frame 814 shows a portion of another simplified mesh comprising the hand of the subject. The simplified mesh depicted in frame 814 also comprises 7,000 triangles and was produced by identifying and deprioritizing a portion of an initial mesh as described above. Frame 816 shows a texture applied to the simplified mesh of frame 814. As shown in frame 816, the simplified mesh produced in accordance with the methods described above includes fewer visual artifacts than the mesh depicted in frames 802-804.

FIG. 8 shows a portion of a simplified mesh comprising eight subjects. Frame 902 depicts a simplified mesh comprising 30,000 triangles produced using mesh decimation without identifying one or more patches corresponding to the hand as described herein. Frame 904 shows a texture applied to the simplified mesh of frame 902. As shown in frame 904, the textured mesh includes visual artifacts in the form of a pointy and deformed fingertip 906.

In contrast, frame 908 shows a portion of another simplified mesh comprising the same scene as frames 902 and 904. The simplified mesh depicted in frame 908 also comprises 30,000 triangles and was produced by identifying and deprioritizing a portion of an initial mesh as described above. Frame 910 shows a texture applied to the simplified mesh of frame 908. As shown in frames 908 and 910, the simplified mesh produced in accordance with the methods described above includes fewer visual artifacts than the mesh depicted in frames 902-904. This increase in visual quality can be leveraged to reduce the size of AR/VR content and other 3D mesh models. This can increase processing speeds and reduce power consumption, as well as enable users to interact with such content via platforms with slim computing resources, such as mobile devices.

Figure 9A:
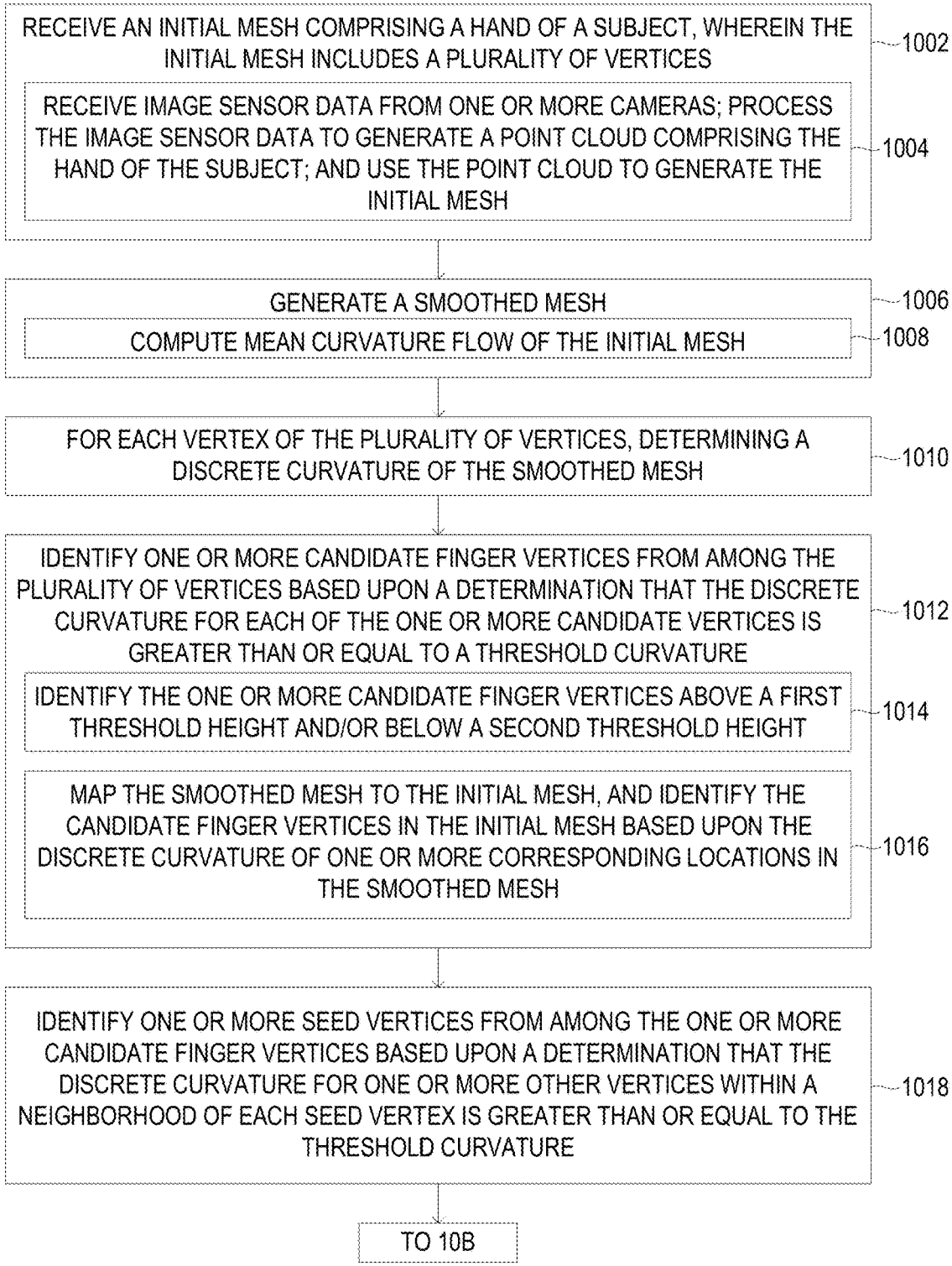
FIGS. 9A-9B show a flow diagram illustrating a method for generating a simplified mesh.
Figure 9B:
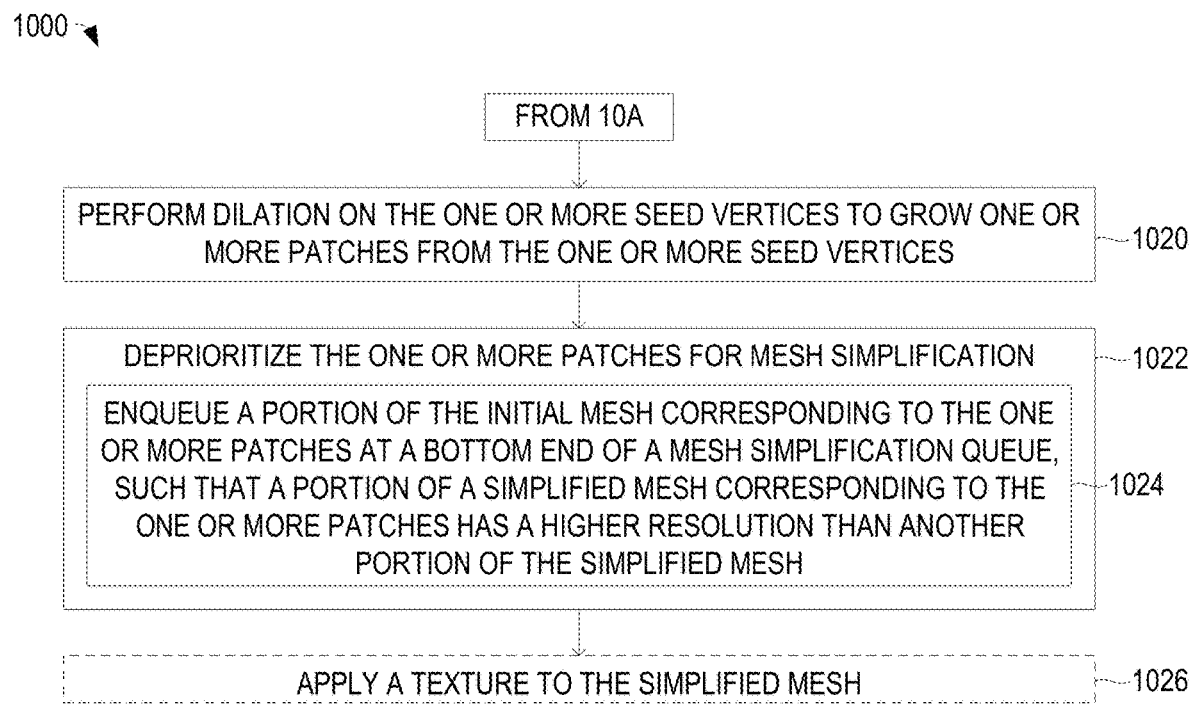

FIGS. 9A-9B show a flow diagram illustrating an example method 1000 for generating a simplified mesh. The following description of the method 1000 is provided with reference to the software and hardware components described above and shown in FIGS. 1-8 and 10. In some examples, one or more aspects of the method 1000 are performed at the computing system 104 of FIG. 1. It will be appreciated that the method 1000 also may be performed in other contexts using other suitable hardware and software components.

Referring now to FIG. 9A, at step 1002, the method 1000 comprises receiving an initial mesh comprising a hand of a subject, wherein the initial mesh includes a plurality of vertices. For example, the computing system 104 of FIG. 1 is configured to receive the initial mesh 110. The initial mesh 110 comprises a 3D structural representation of the subject.

In some examples, at step 1004, the method 1000 comprises receiving image sensor data from one or more cameras. The image sensor data is processed to generate a point cloud comprising the hand of the subject. The method 1000 further comprises using the point cloud to generate the initial mesh. In some examples, the computing system 104 of FIG. 1 is configured to receive image sensor data 116 from the one or more cameras 118. The image sensor data 116 is processed to generate the point cloud 120, which is used to generate the initial mesh 110. In this manner, the computing system 104 is configured to process the image sensor data 116 locally to generate the initial mesh 110. In other examples, one or more aspects of generating the initial mesh 110 may be offloaded from the computing system 104.

At 1006, the method 1000 comprises generating a smoothed mesh. For example, the computing system 104 of FIG. 1 is configured to generate the smoothed mesh 122 based upon the initial mesh 110. The smoothed mesh can be used to identify a subject's fingers by computing the curvature of the mesh.

In some examples, at 1008, generating the smoothed mesh comprises computing mean curvature flow of the initial mesh. FIG. 3 shows an example of a smoothed mesh 208 generated by computing mean curvature flow on the initial mesh 200 of FIG. 2. As shown in the example depicted in FIG. 3, the mean curvature flow smooths the mesh while preserving pointed features, such as fingertips 210. Preserving these features can reduce the occurrence of false positives.

At step 1010, the method 1000 comprises, for each vertex of the plurality of vertices, determining a discrete curvature of the smoothed mesh. For example, the computing system 104 of FIG. 1 is configured to determine the discrete curvature 124 of the smoothed mesh 122. In this manner, the computing system 104 identifies one or more vertices that potentially correspond to fingertips.

The method 1000 further comprises, at 1012, identifying one or more candidate finger vertices from among the plurality of vertices based upon a determination that the discrete curvature for each of the one or more candidate vertices is greater than or equal to a threshold curvature. For example, the computing system 104 of FIG. 1 is configured to identify the one or more candidate finger vertices 126 based upon determining that the discrete curvature 124 is greater than or equal to the threshold curvature 128. This provides the computing system 104 with one or more candidate locations within the initial mesh 110 that likely correspond to fingertips.

In some examples, at 1014, the method 1000 includes identifying the one or more candidate finger vertices above a first threshold height and/or below a second threshold height. For example, the computing system 104 may be configured to identify the one or more candidate finger vertices 126 above the first threshold height 130 and/or below the second threshold height 132. This may reduce the occurrence of false positives and enables the candidate finger vertices to be identified more rapidly than by processing the entire mesh.

At 1016, in some examples, the method 1000 includes mapping the smoothed mesh to the initial mesh. Identifying the one or more candidate finger vertices further comprises identifying the one or more candidate finger vertices in the initial mesh based upon the discrete curvature of one or more corresponding locations in the smoothed mesh. For example, a vertex on the smoothed mesh 208 of FIG. 3 can be indexed to a location of a corresponding vertex 206 in the initial mesh 200 of FIG. 2. In this manner, the computing system 104 can identify the one or more candidate finger vertices based upon analyzing the one or more corresponding locations in the smoothed mesh.

The method 1000 further comprises, at 1018, identifying one or more seed vertices from among the one or more candidate finger vertices based upon a determination that the discrete curvature for one or more other vertices within a neighborhood of each seed vertex is greater than or equal to the threshold curvature. FIG. 5 shows an example of a plurality of seed vertices 212 in the initial mesh 200 of FIG. 2. The identification of the one or more seed vertices from the among the one or more candidate finger vertices can reduce the occurrence of false positives.

Referring now to FIG. 9B, at 1020, the method 1000 comprises performing dilation on the one or more seed vertices to grow one or more patches from the one or more seed vertices. FIG. 6 shows an example of a patch 224 grown by dilating the seed vertices 212 of FIG. 5. The one or more patches designate regions in which to preserve resolution while simplifying the initial mesh. Accordingly, and in one potential advantage of the present disclosure, the initial mesh can be simplified in a manner that preserves detail in a region corresponding to the subject's hand.

At 1022, the method 1000 comprises deprioritizing the one or more patches for mesh simplification. In some examples, at 1024, deprioritizing the one or more patches for the mesh simplification comprises queueing a portion of the initial mesh corresponding to the one or more patches at a bottom end of a mesh simplification queue, such that a portion of a simplified mesh corresponding to the one or more patches has a higher resolution than another portion of the simplified mesh. In this manner, the portion of the simplified mesh corresponding to the one or more patches includes a higher level of detail than another portion of the simplified mesh.

In some examples, at 1026, the method 1000 includes applying a texture to the simplified mesh. In this manner, the simplified mesh is used to produce 3D content (e.g., for AR and/or VR applications) that occupies less memory and is less computationally expensive to process than content produced using the initial high-resolution mesh.

The above-described systems and methods may be used to generate a simplified mesh that preserves geometric details in fingers and/or hands. One or more candidate finger vertices are identified based upon discrete curvature of a smoothed mesh. Identifying the one or more candidate finger vertices in this manner maintains accuracy across diverse skin tones and image textures. One or more seed vertices are identified from among the one or more candidate finger vertices based upon the discrete curvature for one or more other vertices within a neighborhood of each seed vertex. This can reduce the occurrence of false positives. Next, one or more patches are grown by dilating the one or more seed vertices. The one or more patches are deprioritized for mesh simplification. Accordingly, and in one potential advantage of the present disclosure, the simplified mesh preserves detail in a region corresponding to the subject's hand.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
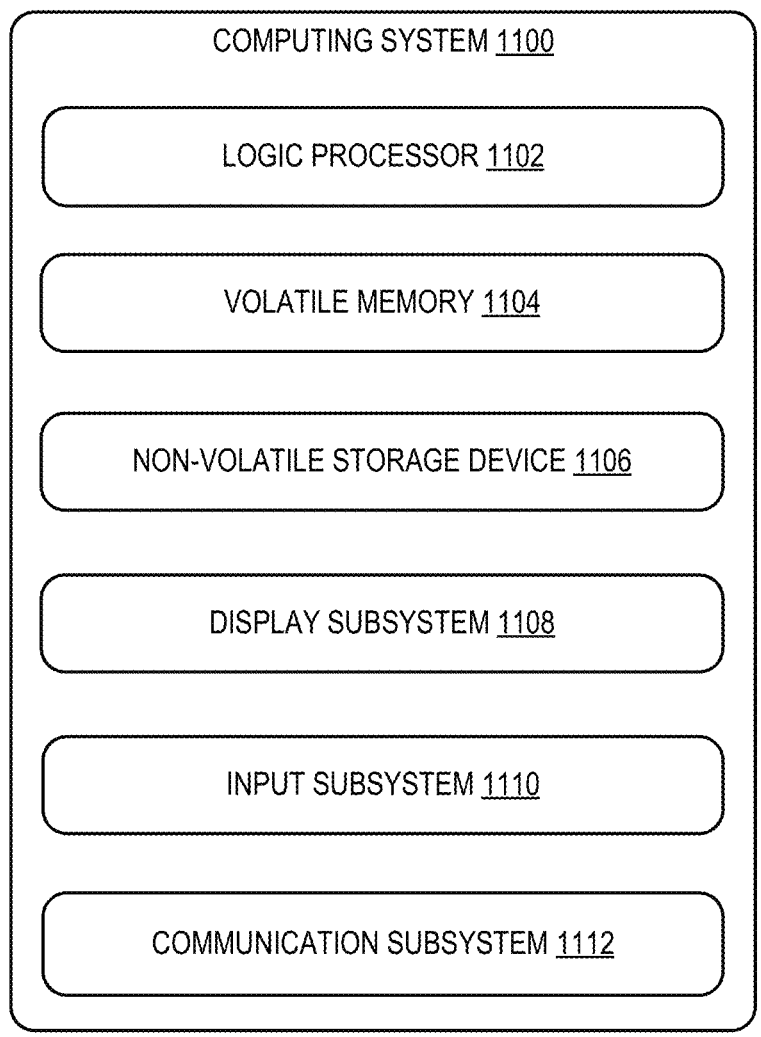
FIG. 10 is a schematic diagram illustrating an example computing system.

FIG. 10 schematically shows a non-limiting embodiment of a computing system 1100 that can enact one or more of the processes described above. Computing system 1100 is shown in simplified form. In some examples, computing system 1100 embodies the computing system 104 of FIG. 1 described above. Computing system 1100 can take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 1100 includes a logic processor 1102, volatile memory 1104, and a non-volatile storage device 1106. Computing system 1100 can optionally include a display subsystem 1108, input subsystem 1110, communication subsystem 1112, and/or other components not shown in FIG. 10.

Logic processor 1102 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor can include one or more physical processors (hardware) configured to execute software instructions. Additionally or alternatively, the logic processor can include one or more hardware logic circuits or firmware devices configured to execute hardware-implemented logic or firmware instructions. Processors of the logic processor 1102 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 1106 includes one or more physical devices configured to hold instructions executable by the logic processors to implement the methods and processes described herein. When such methods and processes are implemented, the state of non-volatile storage device 1106 may be transformed—e.g., to hold different data.

Non-volatile storage device 1106 can include physical devices that are removable and/or built in. Non-volatile storage device 1106 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 1106 can include nonvolatile, dynamic, static, read/write, read-only, sequential-access, location-addressable, file-addressable, and/or content-addressable devices. It will be appreciated that non-volatile storage device 1106 is configured to hold instructions even when power is cut to the non-volatile storage device 1106.

Volatile memory 1104 can include physical devices that include random access memory. Volatile memory 1104 is typically utilized by logic processor 1102 to temporarily store information during processing of software instructions. It will be appreciated that volatile memory 1104 typically does not continue to store instructions when power is cut to the volatile memory 1104.

Aspects of logic processor 1102, volatile memory 1104, and non-volatile storage device 1106 may be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), SOC, and complex programmable logic devices (CPLDs), for example.

The term "program" may be used to describe an aspect of computing system 1100 implemented to perform a particular function. In some cases, a program may be instantiated via logic processor 1102 executing instructions held by non-volatile storage device 1106, using portions of volatile memory 1104. It will be understood that different programs may be instantiated from the same application, service, code block, object, library, routine, API, function, etc. Likewise, the same program may be instantiated by different applications, services, code blocks, objects, routines, APIs, functions, etc. The term "program" can encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included display subsystem 1108 may be used to present a visual representation of data held by non-volatile storage device 1106. The visual representation can take the form of a graphical user interface (GUI). As the herein described methods and processes change the data held by the non-volatile storage device, and thus transform the state of the non-volatile storage device, the state of display subsystem 1108 can likewise be transformed to visually represent changes in the underlying data. Display subsystem 1108 can include one or more display devices utilizing virtually any type of technology. Such display devices may be combined with logic processor 1102, volatile memory 1104, and/or non-volatile storage device 1106 in a shared enclosure, or such display devices may be peripheral display devices.

When included, input subsystem 1110 can comprise or interface with one or more user-input devices such as a keyboard, mouse, touch screen, or game controller. In some embodiments, the input subsystem can comprise or interface with selected natural user input (NUI) componentry. Such componentry may be integrated or peripheral, and the transduction and/or processing of input actions may be handled on- or off-board. Example NUI componentry can include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 1112 may be configured to communicatively couple various computing devices described herein with each other, and with other devices. Communication subsystem 1112 can include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem can allow computing system 1100 to send and/or receive messages to and/or from other devices via a network such as the Internet.

The following paragraphs provide additional support for the claims of the subject application. One aspect provides a computing device, comprising: a processor; and a memory storing instructions executable by the processor to receive an initial mesh comprising a hand of a subject, wherein the initial mesh includes a plurality of vertices; generate a smoothed mesh; for each vertex of the plurality of vertices, determine a discrete curvature of the smoothed mesh; identify one or more candidate finger vertices from among the plurality of vertices based upon a determination that the discrete curvature for each of the one or more candidate vertices is greater than or equal to a threshold curvature; identify one or more seed vertices from among the one or more candidate finger vertices based upon a determination that the discrete curvature for one or more other vertices within a neighborhood of each seed vertex is greater than or equal to the threshold curvature; perform dilation on the one or more seed vertices to grow one or more patches from the one or more seed vertices; and deprioritize the one or more patches for mesh simplification. In some examples of this aspect, the instructions executable to deprioritize the one or more patches are additionally or alternatively executable to queue a portion of the initial mesh corresponding to the one or more patches at a bottom end of a mesh simplification queue, such that a portion of a simplified mesh corresponding to the one or more patches has a higher resolution than another portion of the simplified mesh. In some examples of this aspect, the instructions executable to generate the smoothed mesh are additionally or alternatively executable to compute mean curvature flow of the initial mesh. In some examples of this aspect, the threshold curvature is additionally or alternatively in the range of 0-1. In some examples of this aspect, the neighborhood of each seed vertex additionally or alternatively comprises an area within 3 rings of the seed vertex. In some examples of this aspect, the instructions executable to perform the dilation are additionally or alternatively executable to use a dilation parameter in the range of 0 to 40. In some examples of this aspect, the instructions are additionally or alternatively executable to identify the one or more candidate finger vertices above a first threshold height and/or below a second threshold height. In some examples of this aspect, the first threshold height is additionally or alternatively in the range of 1-3 feet and the second threshold height is additionally or alternatively in the range of 5-6 feet. In some examples of this aspect, the instructions are additionally or alternatively executable to map the smoothed mesh to the initial mesh, and the instructions executable to identify the one or more candidate finger vertices additionally or alternatively comprise instructions executable to identify the one or more candidate finger vertices in the initial mesh based upon the discrete curvature of one or more corresponding locations in the smoothed mesh. In some examples of this aspect, the instructions are additionally or alternatively executable to: receive image sensor data from one or more cameras; process the image sensor data to generate a point cloud comprising the hand of the subject; and use the point cloud to generate the initial mesh. In some examples of this aspect, the instructions are additionally or alternatively executable to apply a texture to a simplified mesh.

Another aspect provides a method for generating a simplified mesh, the method comprising: receiving an initial mesh comprising a hand of a subject, wherein the initial mesh includes a plurality of vertices; generating a smoothed mesh; for each vertex of the plurality of vertices, determining a discrete curvature of the smoothed mesh; identifying one or more candidate finger vertices from among the plurality of vertices based upon a determination that the discrete curvature for each of the one or more candidate vertices is greater than or equal to a threshold curvature; identifying one or more seed vertices from among the one or more candidate finger vertices based upon a determination that the discrete curvature for one or more other vertices within a neighborhood of each seed vertex is greater than or equal to the threshold curvature; performing dilation on the one or more seed vertices to grow one or more patches from the one or more seed vertices; and deprioritizing the one or more patches for mesh simplification. In some examples of this aspect, deprioritizing the one or more patches for the mesh simplification additionally or alternatively comprises queueing a portion of the initial mesh corresponding to the one or more patches at a bottom end of a mesh simplification queue, such that a portion of the simplified mesh corresponding to the one or more patches has a higher resolution than another portion of the simplified mesh. In some examples of this aspect, generating the smoothed mesh additionally or alternatively comprises computing mean curvature flow of the initial mesh. In some examples of this aspect, the method additionally or alternatively comprises identifying the one or more candidate finger vertices above a first threshold height and/or below a second threshold height. In some examples of this aspect, the method additionally or alternatively comprises mapping the smoothed mesh to the initial mesh, and wherein identifying the one or more candidate finger vertices additionally or alternatively comprises identifying the one or more candidate finger vertices in the initial mesh based upon the discrete curvature of one or more corresponding locations in the smoothed mesh. In some examples of this aspect, the method additionally or alternatively comprises: receiving image sensor data from one or more cameras; processing the image sensor data to generate a point cloud comprising the hand of the subject; and using the point cloud to generate the initial mesh. In some examples of this aspect, the method additionally or alternatively comprises applying a texture to the simplified mesh.

Another aspect provides a computing device, comprising: a processor; and a memory storing instructions executable by the processor to receive image sensor data from one or more cameras; process the image sensor data to generate a point cloud comprising a hand of a subject; use the point cloud to generate an initial mesh comprising the hand of the subject, wherein the initial mesh includes a plurality of vertices; generate a smoothed mesh; for each vertex of the plurality of vertices, determine a curvature of the smoothed mesh; identify one or more candidate finger vertices from among the plurality of vertices based upon a determination that the discrete curvature for each of the one or more candidate vertices is greater than or equal to a threshold curvature; identify one or more seed vertices from among the one or more candidate finger vertices based upon a determination that the discrete curvature for one or more other vertices within a neighborhood of each seed vertex is greater than or equal to the threshold curvature; perform dilation on the one or more seed vertices to grow one or more patches from the one or more seed vertices; queue a portion of the initial mesh corresponding to the one or more patches at a bottom end of a mesh simplification queue; and generate a simplified mesh such that a portion of the simplified mesh corresponding to the one or more patches enqueued at the bottom end of the mesh simplification queue has a higher resolution than another portion of the simplified mesh. In some examples of this aspect, the instructions are additionally or alternatively executable to: apply a texture to the simplified mesh; and output the textured simplified mesh for display.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor; and
a memory storing instructions executable by the processor to
  receive an initial mesh comprising a hand of a subject, wherein the initial mesh includes a plurality of vertices;
  generate a smoothed mesh;
  for each vertex of the plurality of vertices, determine a discrete curvature of the smoothed mesh;
  identify one or more candidate finger vertices from among the plurality of vertices based upon a determination that the discrete curvature for each of the one or more candidate vertices is greater than or equal to a threshold curvature;
  identify one or more seed vertices from among the one or more candidate finger vertices based upon a determination that the discrete curvature for one or more other vertices within a neighborhood of each seed vertex is greater than or equal to the threshold curvature;
  perform dilation on the one or more seed vertices to grow one or more patches from the one or more seed vertices; and
  deprioritize the one or more patches for mesh simplification.

2. The computing device of claim 1, wherein the instructions executable to deprioritize the one or more patches comprise instructions executable to queue a portion of the initial mesh corresponding to the one or more patches at a bottom end of a mesh simplification queue, such that a portion of a simplified mesh corresponding to the one or more patches has a higher resolution than another portion of the simplified mesh.

3. The computing device of claim 1, wherein the instructions executable to generate the smoothed mesh comprise instructions executable to compute mean curvature flow of the initial mesh.

4. The computing device of claim 3, wherein the threshold curvature is in the range of 0-1.

5. The computing device of claim 1, wherein the neighborhood of each seed vertex comprises an area within 3 rings of the seed vertex.

6. The computing device of claim 1, wherein the instructions executable to perform the dilation comprise instructions executable to use a dilation parameter in the range of 0 to 40.

7. The computing device of claim 1, wherein the instructions are further executable to identify the one or more candidate finger vertices above a first threshold height and/or below a second threshold height.

8. The computing device of claim 7, wherein the first threshold height is in the range of 1-3 feet and the second threshold height is in the range of 5-6 feet.

9. The computing device of claim 1, wherein the instructions are further executable to map the smoothed mesh to the initial mesh, and wherein the instructions executable to identify the one or more candidate finger vertices comprise instructions executable to identify the one or more candidate finger vertices in the initial mesh based upon the discrete curvature of one or more corresponding locations in the smoothed mesh.

10. The computing device of claim 1, wherein the instructions are further executable to:
receive image sensor data from one or more cameras;
process the image sensor data to generate a point cloud comprising the hand of the subject; and
use the point cloud to generate the initial mesh.

11. The computing device of claim 1, wherein the instructions are further executable to apply a texture to a simplified mesh.

12. A method for generating a simplified mesh, the method comprising:
receiving an initial mesh comprising a hand of a subject, wherein the initial mesh includes a plurality of vertices;
generating a smoothed mesh;
for each vertex of the plurality of vertices, determining a discrete curvature of the smoothed mesh;
identifying one or more candidate finger vertices from among the plurality of vertices based upon a determination that the discrete curvature for each of the one or more candidate vertices is greater than or equal to a threshold curvature;
identifying one or more seed vertices from among the one or more candidate finger vertices based upon a determination that the discrete curvature for one or more other vertices within a neighborhood of each seed vertex is greater than or equal to the threshold curvature;
performing dilation on the one or more seed vertices to grow one or more patches from the one or more seed vertices; and
deprioritizing the one or more patches for mesh simplification.

13. The method of claim 12, wherein deprioritizing the one or more patches for the mesh simplification comprises queueing a portion of the initial mesh corresponding to the one or more patches at a bottom end of a mesh simplification queue, such that a portion of the simplified mesh corresponding to the one or more patches has a higher resolution than another portion of the simplified mesh.

14. The method of claim 12, wherein generating the smoothed mesh comprises computing mean curvature flow of the initial mesh.

15. The method of claim 12, further comprising identifying the one or more candidate finger vertices above a first threshold height and/or below a second threshold height.

16. The method of claim 12, further comprising mapping the smoothed mesh to the initial mesh, and wherein identifying the one or more candidate finger vertices comprises identifying the one or more candidate finger vertices in the initial mesh based upon the discrete curvature of one or more corresponding locations in the smoothed mesh.

17. The method of claim 12, further comprising:
receiving image sensor data from one or more cameras;
processing the image sensor data to generate a point cloud comprising the hand of the subject; and
using the point cloud to generate the initial mesh.

18. The method of claim 12, further comprising applying a texture to the simplified mesh.

19. A computing device, comprising:
a processor; and
a memory storing instructions executable by the processor to
receive image sensor data from one or more cameras;
process the image sensor data to generate a point cloud comprising a hand of a subject;
use the point cloud to generate an initial mesh comprising the hand of the subject, wherein the initial mesh includes a plurality of vertices;
generate a smoothed mesh;
for each vertex of the plurality of vertices, determine a discrete curvature of the smoothed mesh;
identify one or more candidate finger vertices from among the plurality of vertices based upon a determination that the discrete curvature for each of the one or more candidate vertices is greater than or equal to a threshold curvature;
identify one or more seed vertices from among the one or more candidate finger vertices based upon a determination that the discrete curvature for one or more other vertices within a neighborhood of each seed vertex is greater than or equal to the threshold curvature;
perform dilation on the one or more seed vertices to grow one or more patches from the one or more seed vertices;
queue a portion of the initial mesh corresponding to the one or more patches at a bottom end of a mesh simplification queue; and
generate a simplified mesh such that a portion of the simplified mesh corresponding to the one or more patches enqueued at the bottom end of the mesh simplification queue has a higher resolution than another portion of the simplified mesh.

20. The computing device of claim 19, wherein the instructions are further executable to:
apply a texture to the simplified mesh; and
output the textured simplified mesh for display.

* * * * *